United States Patent [19]

Martin

[11] 4,302,327

[45] Nov. 24, 1981

[54] CENTER FLOW SCREENING APPARATUS

[75] Inventor: Andrew C. Martin, Middletown, Ohio

[73] Assignee: The Black Clawson Company, Middletown, Ohio

[21] Appl. No.: 130,918

[22] Filed: Mar. 17, 1980

[51] Int. Cl.³ ............................................. B07B 1/00
[52] U.S. Cl. ................................. 209/240; 209/273; 209/306; 210/338
[58] Field of Search ............... 209/273, 270, 305, 306, 209/240, 379, 268; 210/415, 315, 338

[56] References Cited

U.S. PATENT DOCUMENTS

| | | | |
|---|---|---|---|
| 1,106,808 | 8/1914 | Haug | 209/273 |
| 1,209,153 | 12/1916 | Haug | 209/273 |
| 2,975,899 | 3/1961 | Cannon | 209/273 |
| 3,399,772 | 9/1968 | Salomon | 209/273 |
| 3,497,060 | 2/1970 | Tra | 209/273 |
| 3,767,047 | 10/1973 | Rasmussen | 209/240 |
| 3,874,509 | 4/1975 | Parker | 209/273 X |

FOREIGN PATENT DOCUMENTS

| | | | |
|---|---|---|---|
| 660707 | 4/1963 | Canada | 209/273 |
| 445951 | 5/1925 | Fed. Rep. of Germany | 209/306 |

*Primary Examiner*—Robert Halper
*Attorney, Agent, or Firm*—Biebel, French & Nauman

[57] ABSTRACT

A pressurized screening device has two pairs of concentric cylindrical screenplates, one pair mounted coaxially above the other in a common housing. Each pair of screenplates has a separate rotary impeller mechanism, the impellers being mirror images of each other. The pair of screenplates share a common central feed chamber, common accepts chamber, and a common drive for the two rotary impellers. Each pair of screenplates is provided with a separate rejects collection chamber, one located at the base of the housing and the other located near the top of the housing. This arrangement permits both high capacity operation as well as efficient removal of heavy and light impurities from a feed stream.

6 Claims, 3 Drawing Figures

CENTER FLOW SCREENING APPARATUS

BACKGROUND OF THE INVENTION

This invention relates to a screening device of increased capacity for removing objectionable particles from liquid suspensions, and more particularly to a pressurized device for screening objectionable particles from pulp slurries and paper making stock.

The production of paper making fibers by any known pulping method is incomplete in that certain portions of the wood are not broken down into individual fibers. Such wood portions, which include debris such as shives, bark, slivers, and chop, as well as foreign particles such as sand, grit, and pieces of metal and plastic must be separated from the paper making fibers before the manufacture of paper can begin. Presently, paper making stocks made from secondary fibers (waste paper stocks) contain much greater amounts of foamed and other lightweight plastic particles having specific gravities less than water than have been present in the past.

Removal of these objectionable particles has heretofore been accomplished either by centrifugal cleaning to separate high specific gravity particles from good paper making fibers or by screening to separate large surface area particles from good paper making fibers. In recent years, pressurized screens have become the most common type of screening apparatus in use.

These screening devices generally have a pressurized housing with a cylindrical screen plate dividing the housing into an inner chamber and an outer annular chamber and includes a rotor in the proximity of the screenplate. The slurry to be screened is introduced into the inner chamber and has both a rotary and axial velocity imparted to it by the rotor. The cylindrical plate has slots or holes through which the desirable or accepts fibers pass while the undesirable or rejects particles are retained by the cylindrical screen plate. The accepts and rejects streams are then separately removed from the screening apparatus. Examples of such screening apparatus, include Cannon et al U.S. Pat. No. 2,975,899, and Martindale U.S. Pat. No. 2,835,173.

However, since pressurized screens first appeared commercially, considerable changes have taken place in the industry. The most important of these changes with respect to screens have been increased capacity requirements and a change in the nature of objectionable particles to be removed. For example, while the early screening devices had cylindrical screenplates on the order of 36 inches in diameter and 12 to 24 inches in height, demands for increased capacity have resulted today in screenplates on the order of 60 inches in diameter and 48 inches in height. However, the effective capacity per unit area of screenplate of these larger screening devices has not been as great as the smaller screens.

The production of screening devices of this size presents both structural and hydraulic problems. Structurally, in order to provide a screenplate of sufficient strength and rigidity, a thicker plate material must be used. A drawback to the use of thicker plate materials, however, is that since the passages, either holes or slots, through the screenplate are longer, the effective capacity (i.e., ability of the accepts pulp to pass rapidly through the screenplate) is diminished. A further drawback is that as the overall length of the rotors is increased in the screening devices, they too must be fabricated of thicker material to maintain rigidity. This, in turn, results in greater power requirements to rotate the rotor foils through the pulp suspension. Finally, because of the increased height of the screenplate, a greater amount of thickening of the pulp occurs as it proceeds downwardly through the device resulting in a decreased hydraulic capacity of the device.

Additionally, the standard pressurized screening device in use today was designed with the idea that impurities would be moved downwardly through the device by gravity where they would be taken out of the system through a rejects outlet located at the bottom of the device. Such a design is not efficient where, as with many paper machine furnishes today, considerable amounts of foamed and other lightweight plastic particles are present. These particles tend to float upwardly when entering the screen housing, and are difficult to remove from screening devices having a rejects outlet which is located at the base thereof.

Accordingly, the need exists in this art for a high capacity rotary pressure screen which can efficiently and effectively achieve essentially complete separation of desirable fibers from both heavy and light objectionable particles and fibers in a pulp slurry.

SUMMARY OF THE INVENTION

The present invention meets that need by providing a pressurized screening device having two pairs of concentric cylindrical screenplates, one pair mounted above the other. Although the invention will be described as a vertically-oriented device with upper and lower screening chambers, it will be appreciated by those skilled in the art that the device can be modified to function when rotated 90° onto its side. Each pair of screenplates has a separate rotor mechanism, the rotor mechanisms being mirror images of each other. The two pairs of screenplates are mounted coaxially in a common housing, and share a common feed chamber, a common accepts chamber, and a common drive for the two rotor mechanisms. However, each pair of screenplates has a separate rejects collection chamber and outlet. The rejects chamber for the upper pair of screenplates is located at the upper end of the screenplates near the top of the housing while the rejects chamber for the lower pair of screenplates is located beneath these screenplates near the base of the device.

This arrangement of screenplates permits doubling of the overall screenplate surface in the housing, yet maintains the advantages of a smaller screening device. These advantages include a greater capacity per unit surface area of screenplate and better mechanical stability in comparison with a single screen device. Because the overall height of each screenplate remains small with respect to its diameter, a thinner screenplate material can be used and still be more mechanically stable than a single cylindrical screenplate of the same diameter but twice the length. The ability to use thinner screenplate material increases the capacity of the unit because the passages through the holes or slots in the screenplate will be shorter, permitting more acceptable fibers to pass through the screen in a given time period. The hydraulic capacity of the unit is also greater because the pulp does not dewater as much as it would along the length of a single long screen as it moves from the center inlet toward the rejects chamers at each end of the housing.

Moreover, the provision of dual rejects collection chambers located at opposite ends of the device promotes better removal of objectionable particles. Heavy particles will tend to descend into the lower rejects collection chamber, while very light particles will tend to float into the upper rejects collection chamber for removal.

Finally, because of the increased capacity per unit area of screen of the present invention, a shorter screen assembly may be utilized to obtain the same capacity as larger prior art devices. This enables the rotor and foils to be fabricated of thinner material and yet to possess the requisite strength and stiffness for operation. Thinner foils require less driving power to rotate the pulp slurry and result in an energy saving over prior art devices of the same overall capacity. Also, because of the two sets of screens in the device of the present invention, the foils on the two rotor assemblies can be offset to minimize pulses or surges in the pulp supply stream downstream from the screening device.

Accordingly, it is an object of the present invention to provide a pressurized screening device which efficiently and effectively removes undesirable fibers and objectionable heavy and light particles from desirable fibers in a pulp slurry. This and other objects and advantages of the invention will become apparent from the following description, the accompanying drawings, and the appended claims.

DESCRIPTION OF THE PREFERRED EMBODIMENTS

Figure 1:
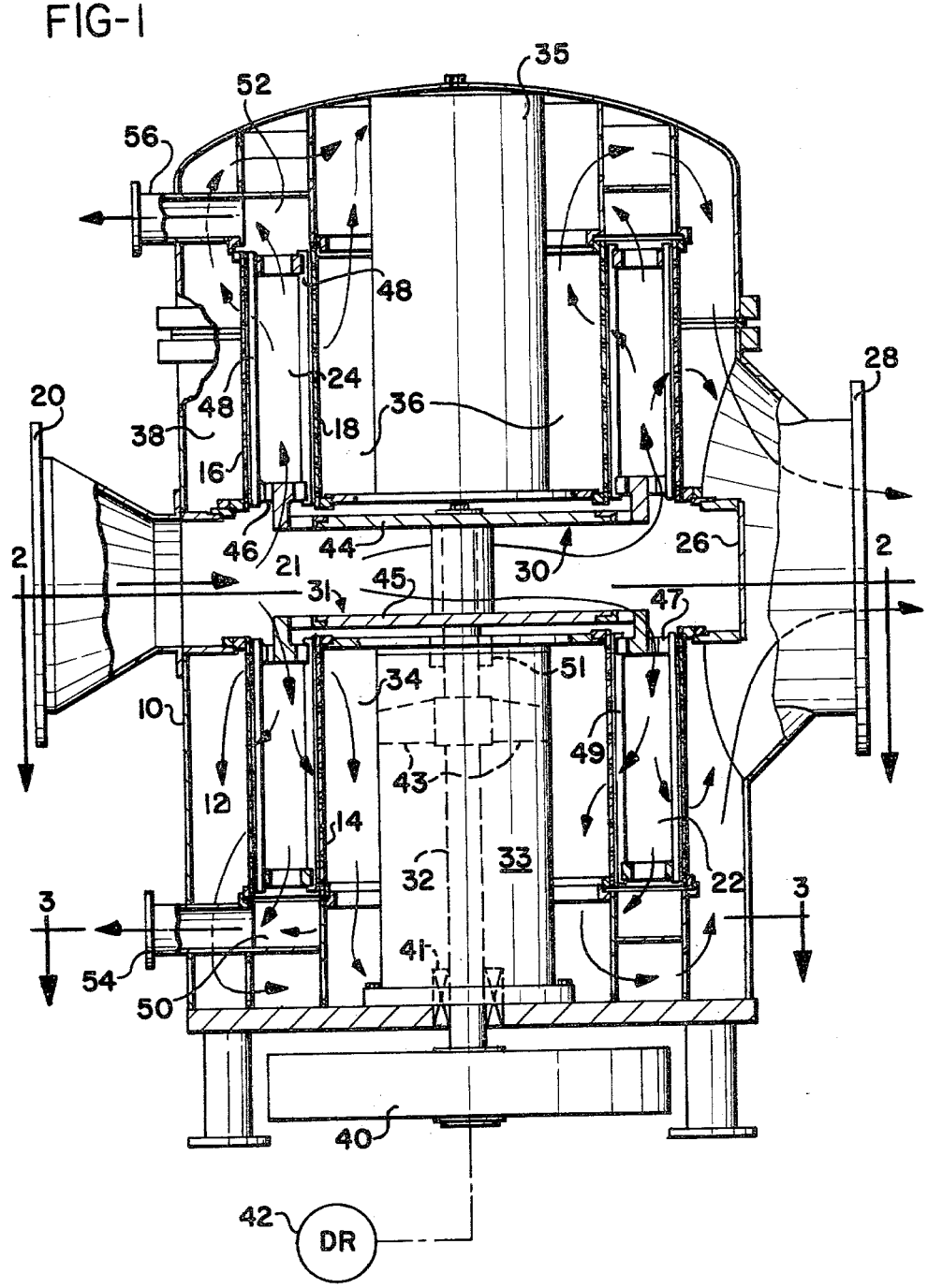
FIG. 1 is a vertical section of the apparatus of the present invention with arrows indicating the direction of flow of a slurry through the apparatus.

As shown, a pressurized screening device in accordance with the present invention comprises a pressurized housing 10 having two pairs of concentric cylindrical screenplates 12, 14, 16 and 18, respectively. These screenplates may have either holes or a series of vertical slots therein for the passage of acceptable fibers. The slurry to be screened enters through a centrally located inlet 20 and from there flows into a lower annular screening chamber 22, formed between screenplates 12 and 14, and an upper annular screening chamber 24, formed between screenplates 16 and 18, respectively. An end wall 26 confines the feed slurry to the screening chambers and prevents any flow directly into accepts outlet 28.

A pair of rotary impeller assemblies 30 and 31 are mounted coaxially, one above the other, inside housing 10. They are driven by a common shaft 32 having bearings 41 and 43 enclosed in cylindrical center shaft housing 33 which defines screenplate 14 a lower accepts chamber 34. A second cylindrical housing 35 is located in the upper portion of housing 10 and defines with screenplate 18 an annular upper accepts chamber 36. An additional pair of lower and upper accepts chambers 37 and 38 are defined by the housing 10 and the screenplates 12 and 16, respectively, and connect directly with the accepts outlet 28.

Shaft 34 is connected through pulley sheaves 40, or other suitable means, to drive means 42 as is conventional in the art. Seals 51, the shaft housing 33, and cylindrical housing 35 provide the internal sealing surfaces for the lower and upper accepts chambers 34, 36, 37, and 38 respectively, through suitable sealing means.

Rotary impeller 30 includes a plurality of rotor arms 44 which connect drive shaft 32 with rotor cage 46. Rotor cage 46 has a plurality of foils 48 mounted thereon which extend substantially the length of screenplates 16 and 18. The foils 48 are alternately mounted inwardly facing screenplate 18 and outwardly facing screenplate 16, and may have a teardrop-shaped cross section such as the foils described in U.S. Pat. No. 2,835,173 to Martindale.

In the embodiment shown, rotary impeller 30 has four rotor arms 44 which are attached by suitable means to cage 46. Eight foils 48, four mounted outwardly facing screenplate 16 and four mounted inwardly facing screenplate 18, are spaced substantially equidistantly around the perimeter of cage 46.

As the foils are rotated, their leading edges create a positive pressure condition which tends to force material in the clearance between the foils and the screenplate through the screenplate. At the same time, a negative pressure condition is developed at the trailing ends of the foils which is effective in drawing away from the screenplate surface large particles which would otherwise tend to remain in place and clog the screenplate. As the foils are continuously rotated, these positive and negative pressure conditions form pressure waves rotating with the foils and continuously tending to force good fiber through the screenplates and to withdraw large particles away from the surface of the screenplates.

Figure 2:
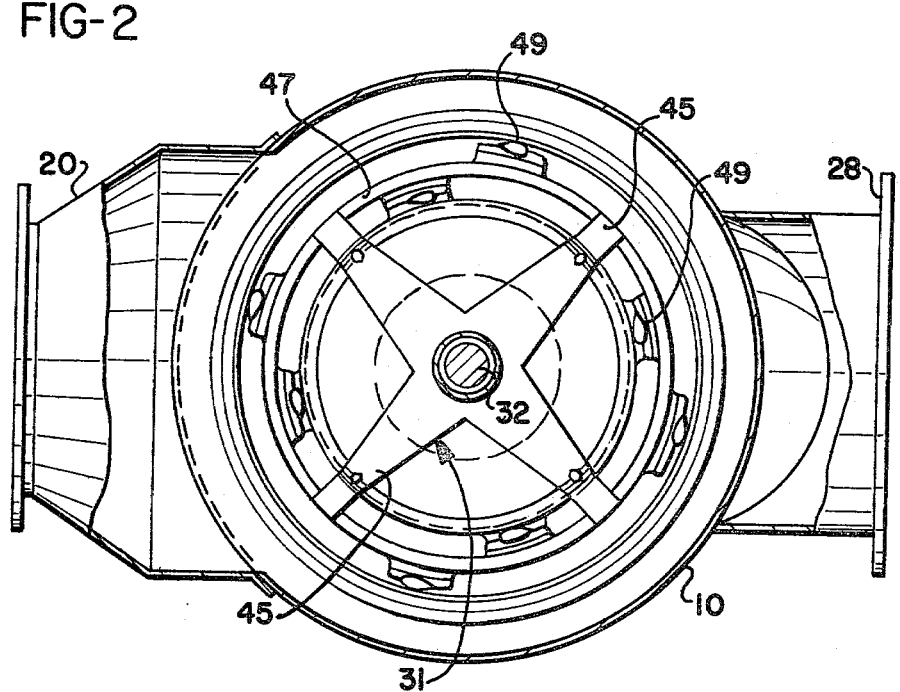
FIG. 2 is a cross-section taken along line 2—2 in FIG. 1.
Figure 3:
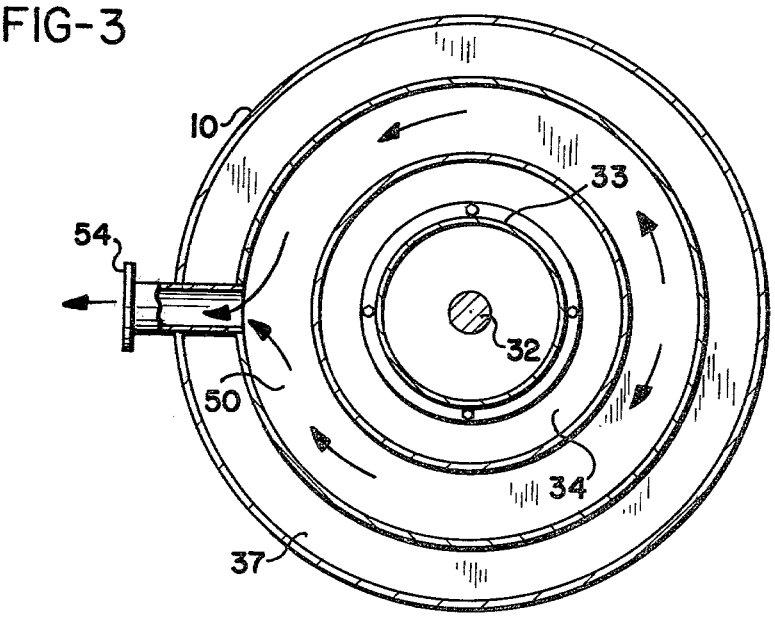
FIG. 3 is a cross-section taken along line 3—3 of FIG. 1.

Rotary impeller 31 is constructed as a mirror image of impeller 30. That is, impeller 31 includes a plurality of rotor arms 45 which connect drive shaft 32 with a rotor cage 47. Rotor cage 47 has a plurality of foils 49 mounted and operated in the same manner as described above. However, to avoid surges or pulses in the accepted stock stream downstream from the screening apparatus of the present invention, the foil positioning on upper impeller 30 can be radially offset from the foil positioning on lower impeller 31 as shown in FIG. 2. By using this staggered arrangement of foils and the rapid rotation of the impellers, the time between pressure pulses or surges can be reduced to the point where a station downstream of the screening apparatus receives an essentially constant supply of stock.

Reject fibers and other impurities which do not pass through screenplates 12, 14, 16, and 18 are collected in a pair of annular rejects collection chambers 50 and 52 and are removed from the apparatus through rejects outlets 54 and 56, respectively. Lower rejects collection chamber 50 is positioned at the base of screenplates 12 and 14 while upper rejects collection chamber 52 is positioned over the top of screenplates 16 and 18. As a result of this structure, both light and heavy impurities may be separated efficiently from the feed stock.

In operation, feed stock enters the apparatus through inlet 20 and flows in the directions shown by the arrows in the figures. A portion of the feed stream flows downwardly into lower stock screening chamber 22 where accepted stock passes through screenplates 12 and 14 and into accepts chambers 34 and 37 for ultimate removal through outlet 28. Heavy impurities and large particles which are not passed through the screenplates are collected in chamber 50 for removal through rejects outlet 54. Impeller 31 is rotated during operation, and foils 49 aid in the passage of acceptable stock through the screenplates. A second portion of the feed stock flows upwardly into screening chamber 24 where it is separated in the same manner into accepts and rejects portions delivered initially to the accepts chambers 36 and 38 and the rejects chambers 52, and then to the outlets 28 and 56 respectively.

Because of the vertical stacking of the screenplates in the apparatus and the provision for a centrally located feed inlet, heavy particles (i.e., those particles having specific gravities greater than that of water entrained in the feed slurry will tend to migrate downwardly for removal through rejects outlet 54. Light particles (i.e., those particles having specific gravities less than that of water), on the other hand, will tend to migrate upwardly for ultimate removal through rejects outlet 56. In this manner, both heavy and light impurities are removed efficiently, avoiding the prior art problem of light impurity removal.

Although the invention has been described as a vertically-oriented device, it will be appreciated by these skilled in the art that it can be rotated 90° onto its side and modified to function in the same manner. The advantages of using a pair of screens having low length to diameter ratios are also realized into a horizontally-oriented pressurized screening device.

While the apparatus herein described constitutes a preferred embodiment of the invention, it is to be understood that the invention is not limited to this precise apparatus, and that changes may be made without departing from the scope of the invention, which is defined in the appended claims.

What is claimed is:

1. A pressurized screening apparatus comprising a housing, means within said housing defining an inlet chamber intermediate and in fluid communication with a first and second stock screening means, said first stock screening means mounted in a fixed position in said housing at a first end thereof for separating a portion of said stock into at least one accepts portion and one rejects portion, said second stock screening means mounted in a fixed position in said housing at the end opposite said first stock screening means and separate therefrom for separating a portion of said stock into at least one accepts portion and one rejects portion, each of said first and second stock screening means including inner and outer generally concentric screenplates defining between them an annular chamber and each of said first and second stock screening means including rotary impeller means mounted for axial rotation within said annular chamber and including at least one foil, means for continuously supplying stock to said inlet chamber for flow therefrom to the area between said inner and outer screenplates on said first and second stock screening means, means for collecting and continuously withdrawing the accepts portions of said stock from said housing, and means for collecting and continuously withdrawing the rejects portions of said stock from said housing.

2. The apparatus of claim 1 wherein said rotary impeller means includes a plurality of foils mounted alternatively facing said inner and outer screenplates.

3. The apparatus of claim 2 wherein the positioning of said foils in said first stock screening means is radially offset from the positioning of said foils in said second stock screening means.

4. The apparatus of claim 1 wherein said rotary impeller means in said first and second stock screening means are driven by a common drive means.

5. A pressurized screening apparatus comprising:
a pressurized housing having a centrally located feed stock inlet chamber, first and second stock screening chambers in fluid communication therewith, common stock accepts chamber means for said first and second stock screening chambers, said first stock screening chamber comprising inner and outer generally concentric screenplates defining between them a first annular chamber in fluid communication with said feed stock inlet chamber, a rejects collection chamber at the end of said annular chamber opposite said feed stock inlet, rotary impeller means mounted for axial rotation within said annular chamber, said rotary impeller means including at least one foil, said second stock screening chamber comprising inner and outer generally concentric screenplates defining between them a second annular chamber in fluid communication with said feed stock inlet chamber, a rejects collection chamber at the end of said annular chamber opposite said feed stock inlet, and rotary impeller means mounted for axial rotation within said annular chamber, said rotary impeller means including at least one foil.

6. The apparatus of claim 5 wherein the positioning of each of said at least one foil in said first stock screening chamber is radially offset from the positioning of each of said at least one foil in said second stock screening chamber.

* * * * *